(12) United States Patent
Tsuchida et al.

(10) Patent No.: US 10,481,257 B2
(45) Date of Patent: Nov. 19, 2019

(54) SYNTHETIC APERTURE RADAR APPARATUS

(71) Applicant: Mitsubishi Electric Corporation, Chiyoda-ku (JP)

(72) Inventors: Masayoshi Tsuchida, Chiyoda-ku (JP); Kei Suwa, Chiyoda-ku (JP); Teruyuki Hara, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 284 days.

(21) Appl. No.: 15/512,752

(22) PCT Filed: Oct. 30, 2014

(86) PCT No.: PCT/JP2014/078954
§ 371 (c)(1),
(2) Date: Mar. 20, 2017

(87) PCT Pub. No.: WO2016/067419
PCT Pub. Date: May 6, 2016

(65) Prior Publication Data
US 2017/0299715 A1  Oct. 19, 2017

(51) Int. Cl.
*G01S 13/90* (2006.01)
*G01S 13/28* (2006.01)

(52) U.S. Cl.
CPC .............. *G01S 13/90* (2013.01); *G01S 13/28* (2013.01)

(58) Field of Classification Search
CPC ......... G01S 13/28; G01S 13/282; G01S 13/90
USPC .......................................................... 342/25
See application file for complete search history.

(56) References Cited

U.S. PATENT DOCUMENTS

| | | | |
|---|---|---|---|
| 2010/0207808 A1* | 8/2010 | Prats | G01S 13/904 342/25 F |
| 2012/0206292 A1 | 8/2012 | Boufounos et al. | |
| 2012/0280851 A1* | 11/2012 | French | G01S 13/28 342/102 |
| 2014/0009326 A1* | 1/2014 | Wishart | G01S 13/9011 342/25 D |

(Continued)

FOREIGN PATENT DOCUMENTS

| | | |
|---|---|---|
| JP | 2003-167052 A | 6/2003 |
| JP | 2012-166168 A | 9/2012 |

(Continued)

OTHER PUBLICATIONS

Extended European Search Report dated Jul. 9, 2018 in Patent Application No. 14905078.3.

(Continued)

*Primary Examiner* — Timothy X Pham
(74) *Attorney, Agent, or Firm* — Oblon, McClelland, Maier & Neustadt, L.L.P.

(57) ABSTRACT

A signal processor 2 is configured so as to compensate for a peak shift of the distance between an SAR sensor 1 and a target, the peak shift occurring in the received signal subjected to range compression performed by an image reconstruction processing unit 14 due to a movement of the SAR sensor 1 during a time period until a reflected wave of a pulse signal is received by the SAR sensor 1 after the pulse signal is emitted from the SAR sensor 1. As a result, even when the SAR sensor 1 moves, an SAR image in which no azimuth ambiguity occurs can be reconstructed.

5 Claims, 5 Drawing Sheets

(56) References Cited

U.S. PATENT DOCUMENTS

| | | | |
|---|---|---|---|
| 2015/0338505 A1* | 11/2015 | Oshima | G01S 7/28 342/107 |
| 2016/0084946 A1* | 3/2016 | Turbide | G01S 7/497 356/4.01 |

FOREIGN PATENT DOCUMENTS

| | | |
|---|---|---|
| JP | 2013-148377 A | 8/2013 |
| JP | 2013-181954 A | 9/2013 |

OTHER PUBLICATIONS

Wen-Qin Wang, et al., "Waveform-Diversity-Based Millimeter-Wave UAV SAR Remote Sensing", IEEE Transactions on Geoscience and Remote Sensing, vol. 47, No. 3, XP011250422, Mar. 2009, pp. 691-700.

Evan C. Zaugg, et al., "Generalized Image Formation for Pulsed and LFM-CW Synthetic Aperture Radar", Dissertation, Department of Electrical and Computer Engineering, Brigham Young University, XP055481277, Apr. 2010, 173 pages.

Pau Prats-Iraola, et al., "On the Processing of Very High Resolution Spaceborne SAR Data", IEEE Transactions on Geoscience and Remote Sensing, vol. 52, No, 10, pp. 6003-6016, (Oct. 2014).

J. Curlander, et al., "Synthetic Aperture Radar Systems and Signal Processing", John Wiley & Sons, Total 5 Pages, (1991).

International Search Report dated Dec. 16, 2014 in PCT/JP2014/078954 filed Oct. 30, 2014.

\* cited by examiner

SYNTHETIC APERTURE RADAR APPARATUS

TECHNICAL FIELD

The present invention relates to a synthetic aperture radar apparatus that reconstructs an SAR image from received signals of a synthetic aperture radar (SAR) sensor.

BACKGROUND ART

In a synthetic aperture radar apparatus disclosed by Patent Literature 1 listed below, in order to make it possible to discriminate between a pulse signal emitted from an SAR sensor at a desired observation point and a pulse signal emitted from the SAR sensor at another observation point other than the desired observation point, the chirp of a pulse signal to be emitted into space is changed (switching between up-chirp and down-chirp is performed).

This makes it possible to reduce unavoidable range ambiguity in synthetic aperture observations.

CITATION LIST

Patent Literature

Patent Literature 1: Japanese Patent Application Publication No. 2003-167052 (for example, paragraph [0018])

SUMMARY OF INVENTION

Technical Problem

Because the conventional synthetic aperture radar apparatus is configured as described above, although unavoidable range ambiguity is reduced in synthetic aperture observations, a process of reconstructing an SAR image is not performed in consideration of a movement of the SAR sensor during a time period until a pulse signal is received by the SAR sensor after the pulse signal is emitted from the SAR sensor. Therefore, when range compression is performed on the received signal of the SAR sensor in the process of reconstructing an SAR image, a peak shift of the distance between the SAR sensor and the target occurs in the received signal subjected to the range compression. As a result, there arises the problem that azimuth ambiguity occurs in the SAR image.

Hereafter, a phenomenon in which azimuth ambiguity occurs in an SAR image will be explained concretely.

The conventional synthetic aperture radar apparatus performs the process of reconstructing an SAR image while assuming that the SAR sensor is standing still during a time period until a pulse signal is received by the SAR sensor after the pulse signal is emitted from the SAR sensor.

However, the SAR sensor is moving in actual observations. Because the frequency of the received signal of the SAR sensor varies from the frequency at the time of transmission due to a movement of this SAR sensor, when the synthetic aperture radar apparatus performs range compression that includes correlation processing with the transmitted signal, there occurs a phenomenon in which, as a result, the peak position of the distance shown by the received signal subjected to the range compression (distance between the SAR sensor and the target) shifts from the original distance.

Because this shift of the distance depends on both the chirp rate of the pulse signal at the time of transmission, and the Doppler frequency, when switching between up-chirp and down-chirp at the time of transmission of the pulse signal is performed for the purpose of the reduction of range ambiguity, the direction in which the distance is shifted is reversed in accordance with the sign of the chirp.

Particularly, in an observation method of changing the transmission direction of a pulse signal during observation (e.g., spotlight, sliding spotlight, TOPS (Terrain Observation by Progressive Scans) or the like), the absolute value of this shift becomes large because the Doppler frequency under observation is large.

FIGS. 5A and 5B are illustrations for explaining a shift in the peak position of the distance in accordance with the sign of the chirp.

FIGS. 5A and 5B show variations in the distance R between the SAR sensor and a point target. The distance R has a minimum of $R_0$ and draws a parabolic locus. In FIG. 5B, the locus of points of the distance R is expressed by a broken line.

When the SAR sensor is standing still, the distance R shown by the received signal subjected to the range compression at each azimuth time (a time intermediate between the transmission and reception times of the pulse signal) is located on the parabolic locus. In FIG. 5B, the peak position of the distance R appears at a position shown by the symbol "○".

However, the distance R shown by the received signal subjected to the range compression is shifted in a range direction under the influence of the movement of the SAR sensor. In FIG. 5B, the peak position of the distance R is shifted to a position shown by the symbol "●".

In observations in which the sign of the chirp is changed alternately, the shift direction of the peak position is reversed in accordance with the sign of the chirp, as shown in FIG. 5B. Further, the shift direction is reversed with a change from positive to negative in the Doppler frequency.

The absolute value of this shift becomes large in proportion to the absolute value of the Doppler frequency. The absolute value of this shift is usually less than the range sampling period, but amplitude modulation in the azimuth direction is made to occur in the arrangement in the azimuth direction along the locus of points of the distance R. This amplitude modulation in the azimuth direction causes azimuth ambiguity to occur in the SAR image.

The present inversion is made in order to solve the above-mentioned problems, and it is therefore an object of the present invention to provide a synthetic aperture radar apparatus capable of reconstructing an SAR image in which no azimuth ambiguity occurs.

Solution to Problem

According to the present invention, there is provided a synthetic aperture radar apparatus which includes: a synthetic aperture radar sensor to emit chirp signals into space, each chirp signal being a pulse signal that has a frequency changing with time and a range chirp rate indicating a rate of change of the frequency being switched, and to receive reflected waves of the chirp signals which are reflected by a target to thereby output received signals of the reflected waves; and a signal processor including an image reconstruction processor that performs range compression on the received signals outputted by the synthetic aperture radar sensor, and reconstructs a synthetic aperture radar image from the received signals subjected to the range compression. The signal processor further includes a peak shift compensator that compensates for a peak shift of a distance between the synthetic aperture radar sensor and the target, the peak shift occurring in the received signal subjected to the range compression performed by the image reconstruction processor, due to a movement of the synthetic aperture radar sensor during a time period until the reflected waves of the chirp signals are received by the synthetic aperture radar sensor after the chirp signals are emitted from the synthetic aperture radar sensor. The peak shift compensator has a DFT unit to perform a discrete Fourier transform on the received signals outputted by the synthetic aperture radar sensor, and a function value multiplier to multiply the received signals subjected to the discrete Fourier transform, by function values of a complex function defined by the range chirp rate at an azimuth time and an azimuth angle in a transmission direction of the pulse signal at the azimuth time, thereby to compensate for the peak shift.

Advantageous Effects of Invention

Because the peak shift compensation means according to the present invention is configured so as to compensate for a peak shift of the distance between the synthetic aperture radar sensor and the target, the peak shift occurring in the received signal subjected to the range compression by the image reconstruction processing means due to a movement of the synthetic aperture radar sensor during a time period until the reflected wave of the chirp signal is received by the synthetic aperture radar sensor after the chirp signal is emitted from the synthetic aperture radar sensor, there is provided an advantage of being able to reconstruct a synthetic aperture radar image in which no azimuth ambiguity occurs.

BRIEF DESCRIPTION OP DRAWINGS

DESCRIPTION OF EMBODIMENTS

Hereafter, in order to explain this invention in greater detail, the preferred embodiments of the present invention will be described with reference to the accompanying drawings.

Embodiment 1

Figure 1:
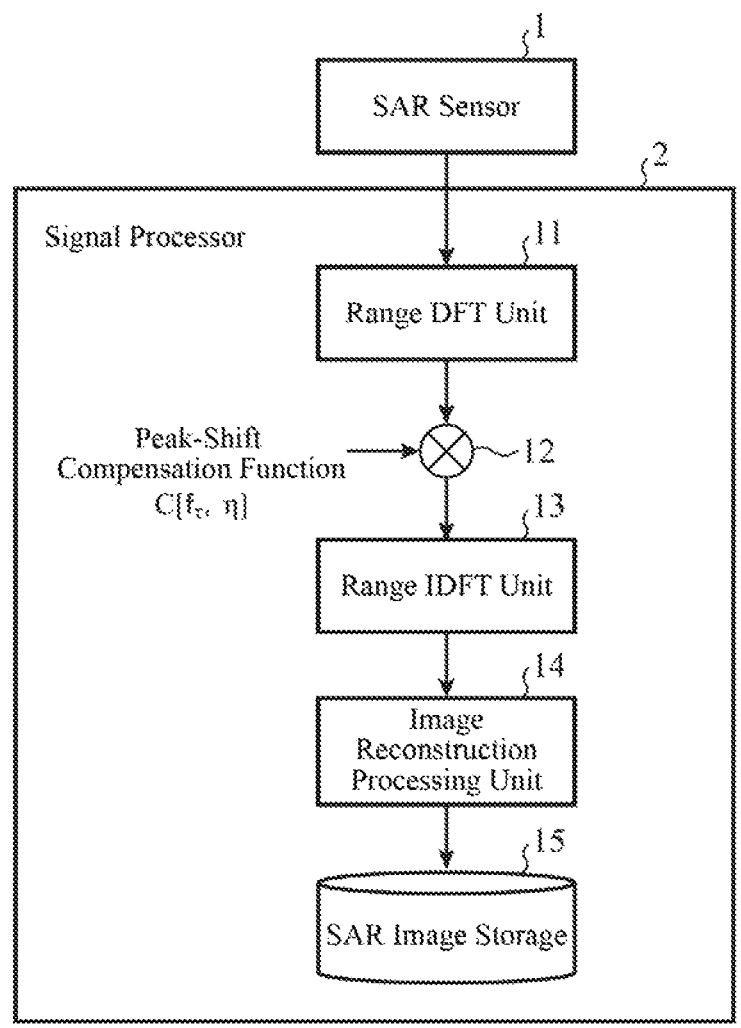
FIG. 1 is a configuration diagram showing a synthetic aperture radar apparatus according to Embodiment 1 of the present invention.

FIG. 1 is a configuration diagram showing a synthetic aperture radar apparatus according to Embodiment 1 of the present invention.

In the configuration shown in FIG. 1, an SAR sensor 1, which is a synthetic aperture radar sensory, emits chirp signals into space, each of the chirp signals having a frequency changing with time, and a range chirp rate $K_r[\eta]$ (a rate of change of the frequency) which is changed at an azimuth time $\eta$ (a time defined by signal transmission and reception times, e.g., a time intermediate between the transmission and reception times of the pulse signal), receives reflected waves of the above-mentioned chirp signals, the reflected waves being reflected by a target, and outputs received signals of the reflected waves.

More specifically, the SAR sensor 1 alternately emits, as the chirp signals, an up-chirp pulse signal having a frequency increasing with time and a down-chirp pulse signal having a frequency decreasing with time, into space while changing their transmission directions.

Further, when receiving a reflected wave of a pulse signal, the reflected wave being reflected by a target, the SAR sensor 1 carries out commonly used signal reception processes (e.g., a process of converting the frequency of a received signal of the reflected wave into an intermediate frequency, a process of performing A/D conversion on the frequency-converted received signal, etc.) on the received signal of the reflected wave, and outputs digital received data which is the received signal subjected to the signal reception processes, to the signal processor 2.

It is assumed that the SAR sensor 1 is moved while being mounted in a moving platform such as an airplane or a satellite.

The signal processor 2 performs range compression on the digital received data outputted from the SAR sensor 1, and reconstructs an SAR image (i.e., a synthetic aperture radar image) from the received data subjected to the range compression.

The signal processor 2 also performs a process of compensating for a peak shift of the distance R between the SAR sensor 1 and the target, the peak shift occurring in the received signal subjected to the range compression due to a movement of the SAR sensor 1 during a time period until the reflected wave of the pulse signal is received by the SAR sensor 1 after the pulse signal is emitted from the SAR sensor 1.

A range DFT unit 11 of the signal processor 2 is comprised of, for example, either a semiconductor integrated circuit equipped with a CPU (Central Processing Unit), or a one chip microcomputer, and carries out a process of performing a discrete Fourier transform, in a range direction, on the digital received data outputted from the SAR sensor 1, and outputting the received data subjected to the discrete Fourier transform to a function value multiplier 12. The range DFT unit 11 constructs a Fourier transform unit.

The function value multiplier 12 of the signal processor 2 is comprised of, for example, either a semiconductor integrated circuit equipped with a CPU, or a one chip microcomputer, and performs a process of multiplying the received data subjected to the discrete Fourier transform in the range DFT unit 11, by the function value $C[f_y, \eta]$ of a complex function in which an amount of compensation for the peak shift is determined from both the range chirp rate $K_r[\eta]$ at the azimuth time $\eta$, and an azimuth angle $\theta[\eta]$ in the transmission direction of the pulse signal at the azimuth time $\eta$.

A range IDFT unit 13 of the signal processor 2 is comprised of, for example, either a semiconductor integrated circuit equipped with a CPU, or a one chip microcomputer, and carries out a process of performing a discrete inverse Fourier transform, in the range direction, on the received data which is multiplied by the function value by the function value multiplier 12, and outputting the received data subjected to the discrete inverse Fourier transform, to an image reconstruction processing unit 14. The range IDFT unit 13 constructs as inverse Fourier transform unit.

A peak shift compensation means is comprised of the range DFT unit 11, the function value multiplier 12 and the range IDFT unit 13.

The image reconstruction processing unit 14 of the signal processor 2 is comprised of, for example, either a semiconductor integrated circuit equipped with a CPU, or a one chip microcomputer, and carries out a process of performing range compression on the received data outputted from the range IDFT unit 13, and reconstructing an SAR image from the received data subjected to the range compression. The image reconstruction processing unit 14 constructs an image reconstruction processing means.

An SAR image storage 15 of the signal processor 2 is comprised of a storage unit, such as a RAM or a hard disk, and stores the SAR image reconstructed by the image reconstruction processing unit 14.

In the example of FIG. 1, it is assumed that the range DFT unit 11, the function value multiplier 12, the range IDFT unit 13, the image reconstruction processing unit 14 and the SAR image storage 15, which are the components of the signal processor 2, are comprised of pieces of hardware for exclusive use, respectively. As an alternative, the signal processor 2 can be comprised of a computer.

In the case in which the signal processor 2 is comprised of a computer, the SAR image storage 15 can be configured on a memory of the computer, and a program in which the details of processes performed by the range DFT unit 11, the function value multiplier 12, the range IDFT unit 13 and the image reconstruction processing unit 14 are described can be stored in a memory of the computer and a CPU of the computer can be made to execute the program stored in the memory.

Figure 2:
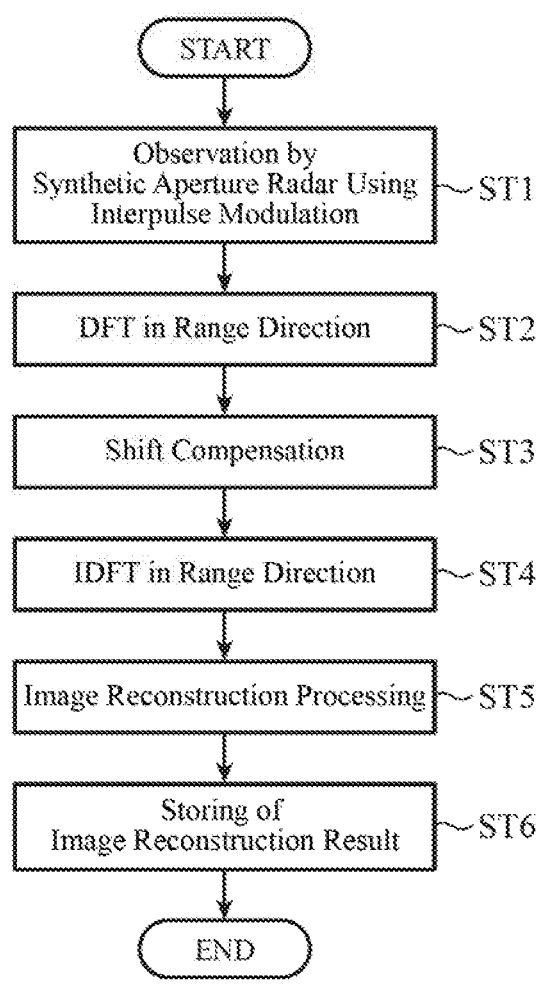
FIG. 2 is a flow chart showing the details of processing per formed by the synthetic aperture radar apparatus according to Embodiment 1 of the present invention.

FIG. 2 is a flow chart showing the details of processing performed by the synthetic aperture radar apparatus according to Embodiment 1 of the present invention.

Next, operations will be explained.

Figure 5A:
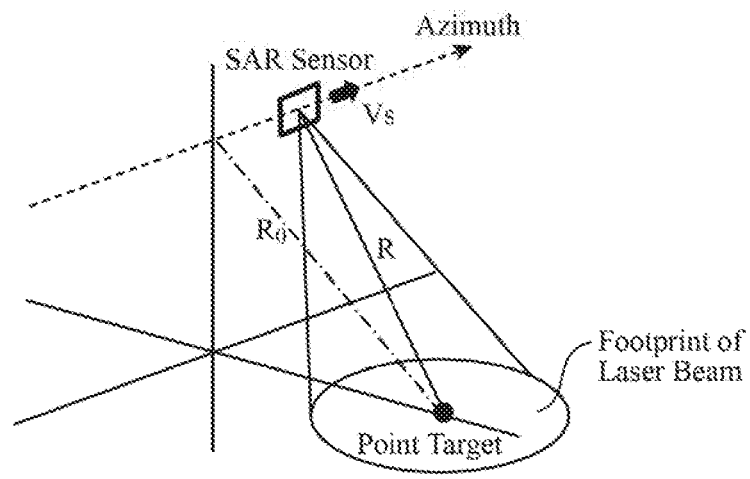
FIGS. 5A and 5B are illustrations for explaining a shift of a peak position of a distance corresponding to the sign of a chirp.

The SAR sensor 1 alternately emits an up-chirp pulse signal having a frequency increasing with time and a down-chirp pulse signal having a frequency decreasing with time, into space, while changing their transmission directions, as shown in FIG. 5A.

As an alternative, the SAR sensor can repeatedly emit only either an up-chirp pulse signal or a down-chirp pulse signal while changing the range chirp rate $K_r[\eta]$ at the azimuth time $\eta$.

Switching between up-chirp and down-chirp in pulse signals can be implemented by changing the sign of the range chirp rate $K_r[\eta]$ at the azimuth time $\eta$.

Further, after emitting a pulse signal, when receiving a reflected wave of the pulse signal, the reflected wave being reflected by a target and then returning thereto, the SAR sensor 1 performs the commonly used signal reception processes (e.g., the process of converting the frequency of a received signal of the reflected wave into an intermediate frequency, and the process of performing A/D conversion on the frequency-converted received signal, etc.) on the received signal of the reflected wave, and outputs digital received data which is the received signal subjected to the signal reception processes, to the signal processor 2 (in step ST1 of FIG. 2).

When receiving the digital received data from the SAR sensor 1, the range DFT unit 11 of the signal processor 2 performs a discrete Fourier transform, in the range direction, on the received data and outputs the received data subjected to the discrete Fourier transform, to the function value multiplier 12, in order to make it possible to perform the process of compensating for a peak shift on range frequency space (in step ST2).

The function value multiplier 12 of the signal processor 2 holds the complex function in which the amount of compensation for the peak shift is determined from both the range chirp rate $K_r[\eta]$ at the azimuth time $\eta$, and the azimuth angle $\theta[\eta]$ in the transmission direction of the pulse signal at the azimuth time $\eta$, as shown in the following equation (1).

$$C[f_r, \eta] = \exp\left[j2\pi f_r \frac{f_0}{K_r[\eta]} \frac{2V_s \sin\theta[\eta]}{c}\right] \quad (1)$$

In the equation (1), $f_r$ denotes the range frequency (the frequency of the received signal of the SAR sensor 1), $f_0$ denotes the center frequency of the pulse signal, $v_s$ denotes the moving speed of the moving platform in which the SAR sensor 1 is mounted, and c denotes the speed of light.

The term $f_0/K_r[\eta]$ and the term $2v_s \sin\theta[\eta]/c$ in the complex function shown by the equation (1) contribute to the compensation for the peak shift.

When receiving the received data subjected to the discrete Fourier transform from the range DFT unit 11, the function value multiplier 12 acquires information showing the range chirp rate $K_r[\eta]$ of the pulse signal emitted at the azimuth time $\eta$, information showing the azimuth angle $\theta[\eta]$ in the transmission direction of the pulse signal, information showing the range frequency $f_r$, information showing the center frequency $f_0$ of the pulse signal, and information showing the moving speed $v_s$ of the moving platform from, for example, the SAR sensor 1, and substitutes the range chirp rate $K_r[\eta]$, the azimuth angle $\theta[\eta]$ in the transmission direction, the range frequency $f_r$, the center frequency $f_0$, the moving speed $v_s$, and the speed of light c into the complex function shown by the equation (1), thereby calculating the function value $C[f_r, \eta]$ of the complex function.

Although the example in which the function value multiplier 12 of the signal processor 2 acquires the above-mentioned pieces of information from the SAR sensor 1 is shown above, the function value multiplier does not have to acquire the above-mentioned pieces of information from the SAR sensor 1 in a case in which the signal processor 2 manages the above-mentioned pieces of information and controls the SAR sensor 1.

After calculating the function value $C[f_r, \eta]$ of the complex function, the function value multiplier 12 multiplies the received data subjected to the discrete Fourier transform outputted from the range DFT unit 11 by the function value $C[f_r, \eta]$, thereby compensating for the peak shift of the distance R, the peak shift occurring in the received signal subjected to the range compression, and outputs the received data subjected to the function value multiplication, to the range IDFT unit 13 (in step ST3).

Although the example of compensating for the peak shift of the distance R by multiplying the received data subjected to the discrete Fourier transform by the function value $C[f_r, \eta]$ of the complex function shown by the equation (1) is shown above, the peak shift of the distance R can be compensated for by alternatively multiplying the received data subjected to the discrete Fourier transform by the function value of even a function other than that shown by the equation (1), as long as the function has a function of compensating for the peak shift of the distance R (as long as the function has a linear phase change), like the complex function shown by the equation (1).

When receiving the received data subjected to the function value multiplication, the range IDFT unit 13 of the signal processor 2 performs a discrete inverse Fourier transform, in the range direction, on the received data in order to return the received data to a signal on range time space, and outputs the received data subjected to the discrete inverse Fourier transform, to the image reconstruction processing unit 14 (in step ST4).

Although the example of performing the process of compensating for the peak shift on the range frequency space is shown above, the signal processor can alternatively perform a process of compensating for the peak shift on the range time space.

In this case, instead of disposing the range DFT unit 11 and the range IDFT unit 13, the function value multiplier 12 time-shifts the received data outputted from the SAR sensor 1 by $(f_0/K_r[\eta])\cdot(2v_s \sin\theta[\eta]/c)$ which contributes to the compensation for the peak shift.

When receiving the received data subjected to the process of compensating for the peak shift from the range IDFT unit 13, the image reconstruction processing unit 14 of the signal processor 2 reconstructs an SAR image by performing commonly used image reconstruction processing, such as range compression and azimuth compression, on the received data (in step ST5) and stores the SAR image in the SAR image storage 15 (in step ST6).

Figure 5B:
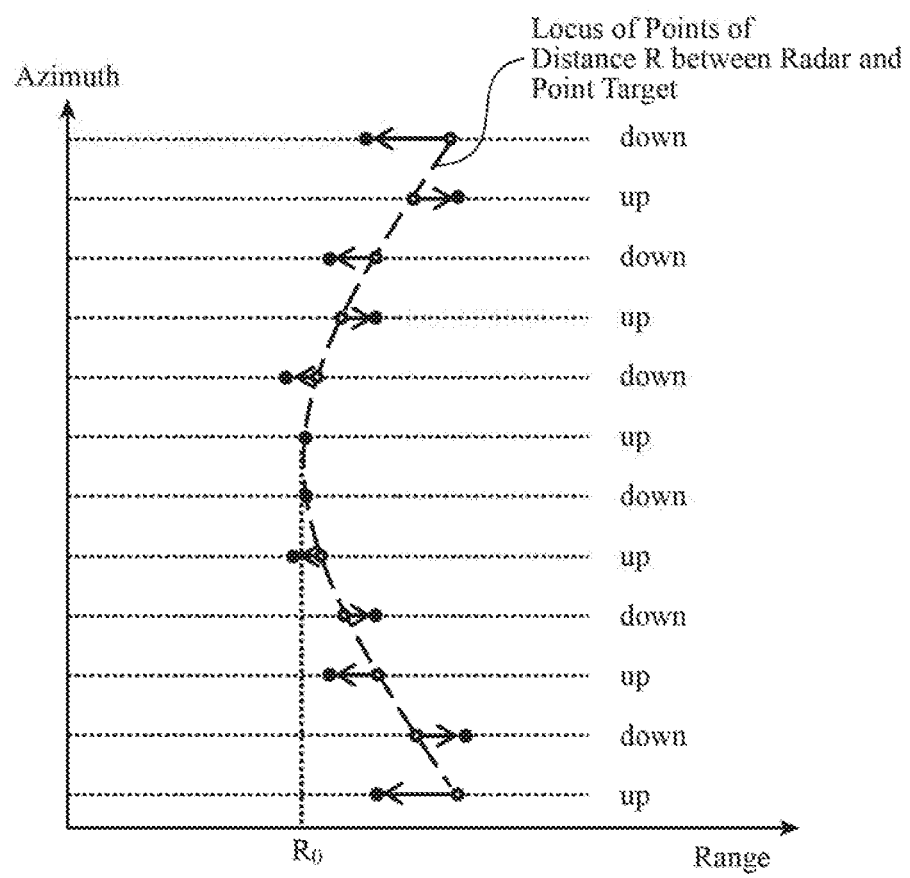

Although a detailed explanation of the process of reconstructing an SAR image will be omitted hereafter because the process of reconstructing an SAR image is a commonly used technique, a peak shift of the distance R does not occur in the received data subjected to the range compression (even if a peak shift of the distance R remains, the peak shift is substantially close to zero) and the distance R shown by the received signal subjected to the range compression appears at a position shown by the symbol "O" in FIG. 5B or at a position close to the position shown by the symbol "O" because, in the image reconstruction processing, the range compression is performed on the received data subjected to the process of compensating for a peak shift.

As can be seen from the above description, because the synthetic aperture radar apparatus according to Embodiment 1 is configured so as to compensate for a peak shift of the distance R between the SAR sensor 1 and a target, the peak shift occurring in the received signal subjected to the range compression performed by the image reconstruction processing unit 14, due to a movement of the SAR sensor 1 during a time period until a reflected wave of a pulse signal is received by the SAR sensor 1 after the pulse signal is emitted from the SAR sensor 1, there is an advantage of being able to reconstruct an SAR image in which no azimuth ambiguity occurs.

Further, because the synthetic aperture radar apparatus according to Embodiment 1 compensates for the peak shift of the distance R occurring in the received signal subjected to the range compression by simply causing the function value multiplier 12 to multiply the received data subjected to a discrete Fourier transform by the function value $C[f_r, \eta]$ of a complex function, the function value multiplier can be easily incorporated into an existing synthetic aperture radar apparatus. Further, the occurrence of azimuth ambiguity can be prevented almost without increasing the arithmetic load.

In addition, because the synthetic aperture radar apparatus compensates for the peak shift of the distance between the SAR sensor 1 and the target for each azimuth time, the synthetic aperture radar apparatus can deal with switching, using interpulse modulation, to an arbitrary range chirp rate for each azimuth time.

Although the example in which the function value multiplier 12 compensates for the peak shift of the distance before the image reconstruction processing unit 14 performs the image reconstruction processing is shown in this Embodiment 1, the image reconstruction processing unit 14 can be configured so as to compensate for the peak shift of the distance, by incorporating the process of performing a discrete Fourier transform, in the range direction, on the received data, the process of multiplying the received data subjected to the discrete Fourier transform by the function value $C[f_r, \eta]$ of the complex function, and the process of performing a discrete inverse Fourier transform, in the range direction, on the received data into the image reconstruction processing performed by the image reconstruction processing unit 14.

Embodiment 2

With respect to the above-described Embodiment 1, the example of alternately emitting an up-chirp pulse signal and a down-chirp pulse signal into space has been explained. With respect to Embodiment 2, an example of continuously emitting down-chirp pulse signals for multiple times after continuously emitting up-chirp pulse signals for multiple times will be explained.

The number of times that up-chirp pulse signals are continuously emitted and the number of times that down-chirp pulse signals are continuously emitted can be fixed or variable.

Figure 3:
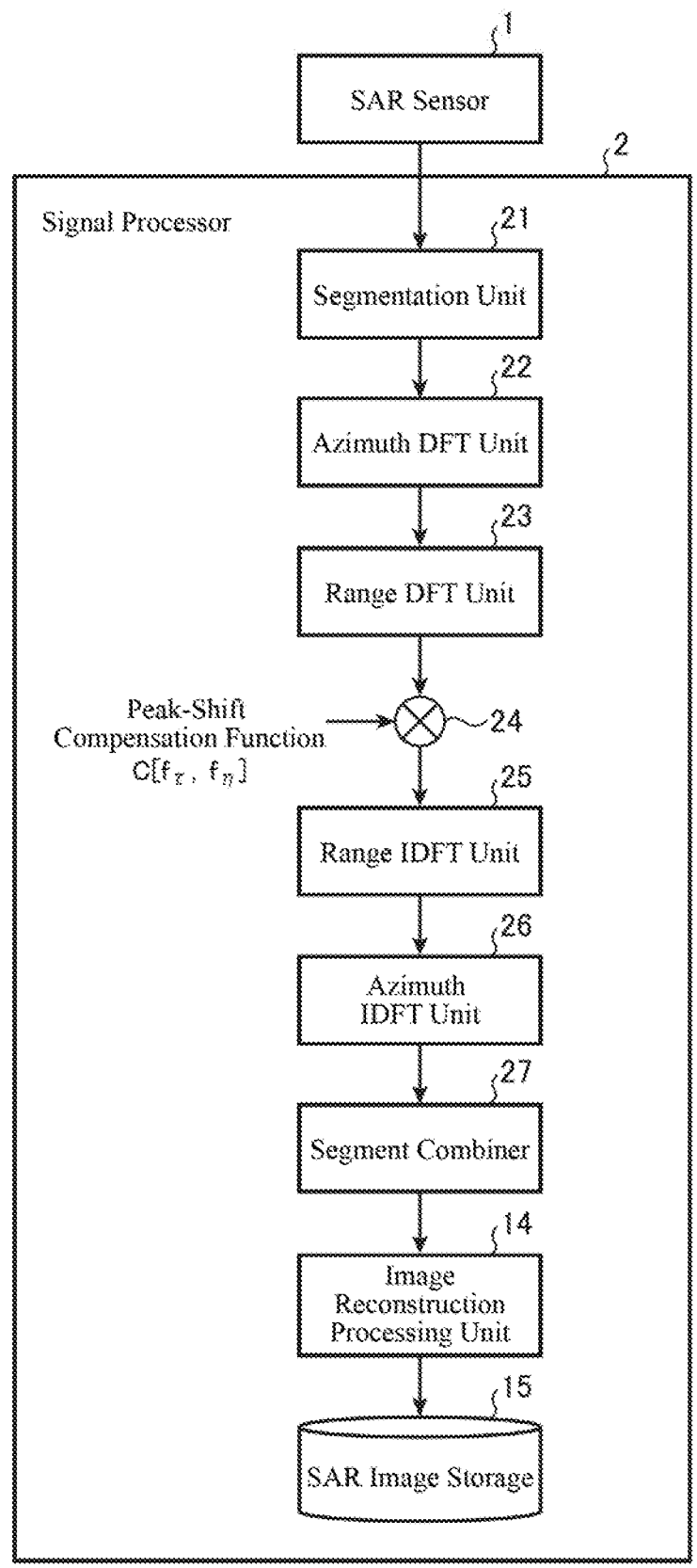
FIG. 3 is a configuration diagram showing a synthetic aperture radar apparatus according to Embodiment 2 of the present invention.

FIG. 3 is a configuration diagram showing a synthetic aperture radar apparatus according to Embodiment 2 of the present invention. In FIG. 3, because the same reference numerals as those shown in FIG. 1 denote the same components or like components, the explanation of the components will be omitted hereafter.

A segmentation unit 21 of a signal processor 2 is comprised of, for example, either a semiconductor integrated circuit equipped with a CPU, or a one chip microcomputer, and performs a process of segmenting digital received data outputted from an SAR sensor 1 into segments in an azimuth direction for each section in which pulse signals having an identical range chirp rate are continuously emitted.

An azimuth DFT unit 22 of the signal processor 2 is comprised of, for example, either a semiconductor integrated circuit equipped with a CPU, or a one chip microcomputer, and carries out a process of performing a discrete Fourier transform, in an azimuth direction, on each of received signals in an identical segment after being segmented by the segmentation unit 21, and outputting the received data subjected to the discrete Fourier transform to a range DFT unit 23.

The range DFT unit 23 of the signal processor 2 is comprised of, for example, either a semiconductor integrated circuit equipped with a CPU, or a one chip microcomputer, and carries out a process of performing a discrete Fourier transform, in a range direction, on the received data outputted from the azimuth DFT unit 22, and outputting the received data subjected to the discrete Fourier transform, to a function value multiplier 24.

A Fourier transform unit is comprised of the azimuth DFT unit 22 and the range DFT unit 23.

The example in which the range DFT unit 23 performs a discrete Fourier transform in the range direction after the azimuth DFT unit 22 performs a discrete Fourier transform in the azimuth direction is shown in FIG. 3. As an alternative, the azimuth DFT unit 22 can perform a discrete Fourier transform in the azimuth direction after the range DFT unit 23 performs a discrete Fourier transform in the range direction.

The function value multiplier 24 of the signal processor 2 is comprised of, for example, either a semiconductor integrated circuit equipped with a CPU, or a one chip microcomputer, and performs a process of multiplying the received data subjected to the discrete Fourier transform in the range DFT unit 23, by the function value $C[f_v, f_n]$ of a complex function in which the amount of compensation for a peak shift is determined from the range chirp rate in the segment in the azimuth direction to which the received data outputted from the range DFT unit 23 belongs, and an azimuth frequency $f_n$ (Doppler frequency).

A range IDFT unit 25 of the signal processor 2 is comprised of, for example, either a semiconductor integrated circuit equipped with a CPU, or a one chip microcomputer, and carries out a process of performing a discrete inverse Fourier transform, in the range direction, on the received data which is multiplied by the function value by the function value multiplier 24, and outputting the received data subjected to the discrete inverse Fourier transform, to an azimuth IDFT unit 26.

The azimuth IDFT unit 26 of the signal processor 2 is comprised of, for example, either a semiconductor integrated circuit equipped with a CPU, or a one chip microcomputer, and carries out a process of performing a discrete inverse Fourier transform, in the azimuth direction, on the received data outputted from the range IDFT unit 25, and outputting the received data subjected to the discrete inverse Fourier transform, to a segment combiner 27.

An inverse Fourier transform unit is comprised of the range IDFT unit 25 and the azimuth IDFT unit 26.

The example in which the azimuth IDFT unit 26 performs a discrete inverse Fourier transform in the azimuth direction after the range IDFT unit 25 performs a discrete inverse Fourier transform in the range direction is shown in FIG. 3. As an alternative, the range IDFT unit 25 can perform a discrete inverse Fourier transform in the range direction after the azimuth IDFT unit 26 performs a discrete inverse Fourier transform in the azimuth direction.

The segment combiner 27 of the signal processor 2 is comprised of, for example, either a semiconductor integrated circuit equipped with a CPU, or a one chip microcomputer, and performs a process of combining received data belonging to an identical segment and outputted from the azimuth IDFT unit 26, and outputting received data subjected to the combining, to an image reconstruction processing unit 14.

A peak shift compensation means is comprised of the segmentation unit 21, the azimuth DFT unit 22, the range DFT unit 23, the function value multiplier 24, the range IDFT unit 25, the azimuth IDFT unit 26 and the segment combiner 27.

In the example of FIG. 3, it is assumed that the segmentation unit 21, the azimuth DFT unit 22, the range DFT unit 23, the function value multiplier 24, the range IDFT unit 25, azimuth IDFT unit 26, the segment combiner 27, the image reconstruction processing unit 14 and an SAR image storage 15, which are the components of the signal processor 2, are comprised of pieces of hardware for exclusive use. As an alternative, the signal processor 2 can be comprised of a computer.

In the case in which the signal processor 2 is comprised of a computer, the SAR image storage 15 can be configured on a memory of the computer, and a program in which the details of processes performed by the segmentation unit 21, the azimuth DFT unit 22, the range DFT unit 23, the function value multiplier 24, the range IDFT unit 25, the azimuth IDFT unit 26, the segment combiner 27 and the image reconstruction processing unit 14 are described can be stored in a memory of the computer and a CPU of the computer can be made to execute the program stored in the memory.

Figure 4:
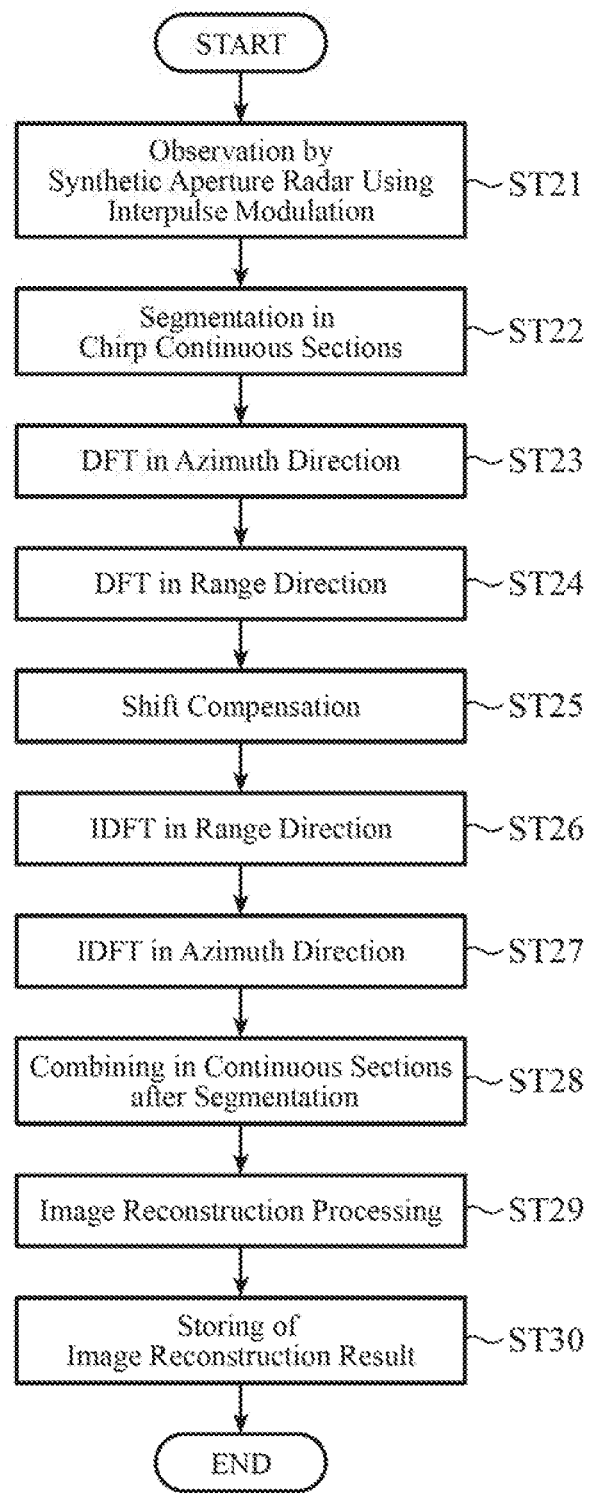
FIG. 4 is a flow chart showing the details of processing performed by the synthetic aperture radar apparatus Embodiment 2 of the present invention.

FIG. 4 is a flow chart showing the details of processing performed by the synthetic aperture radar apparatus according to Embodiment 2 of the present invention.

Next, operations will be explained.

The SAR sensor 1 emits either up-chirp pulse signals or down-chirp pulse signals into space while changing their transmission directions, as shown in FIG. 5A.

In this Embodiment 2, a section in which the SAR sensor continuously emits up-chirp pulse signals for multiple times and a section in which the SAR sensor continuously emits down-chirp pulse signals for multiple times are provided, and the SAR sensor switches between these sections.

In the present Embodiment, the example in which a section in which the SAR sensor continuously emits up-chirp pulse signals for multiple times and a section in which the SAR sensor continuously emits down-chirp pulse signals for multiple times are provided. A section in which the SAR sensor continuously emits pulse signals whose range chirp rate is set to a first value for multiple times and a section in which the SAR sensor continuously emits pulse signals whose range chirp rate is set to a second value for multiple times can be provided, and the SAR sensor can switch between these sections.

After emitting a pulse signal, when receiving a reflected wave of the pulse signal, the reflected wave being reflected by a target and then returning thereto, the SAR sensor 1 performs commonly used signal reception processes on the received signal of the reflected wave, and outputs digital received data which is the received signal subjected to the signal reception processes, to the signal processor 2 (in step ST21 of FIG. 4), like that according to above-mentioned Embodiment 1.

When receiving the digital received data from the SAR sensor 1, the segmentation unit 21 of the signal processor 2 segments the digital received data outputted from the SAR sensor 1 into segments in the azimuth direction for each section in which pulse signals having an identical range chirp rate are continuously emitted (in step ST22).

For example, in a case in which the SAR sensor 1 is set up in such a way as to continuously emit down-chirp pulse signals for four times after continuously emitting up-chirp pulse signals for three times, the segmentation unit segments three pieces of received data about the up-chirp pulse signals, into segments in the azimuth direction, and also segments four pieces of received data about the down-chirp pulse signals, into segments in the azimuth direction.

After the segmentation unit 21 segments the digital received data outputted from the SAR sensor 1 into segments in the azimuth direction, the azimuth DFT unit 22 of the signal processor 2 performs a discrete Fourier transform, in the azimuth direction, on each of the received signals belonging to an identical segment in order to make it possible to perform a process of compensating for a peak shift on two-dimensional frequency space (azimuth frequency/range frequency space), and outputs the received data subjected to the discrete Fourier transform, to the range DFT unit 23 (in step ST23).

When receiving the received data from the azimuth DFT unit 22, the range DFT unit 23 of the signal processor 2 performs a discrete Fourier transform, in the range direction, on the received data and outputs the received data subjected to the discrete Fourier transform, to the function value multiplier 24 (in step ST24).

The function value multiplier 24 of the signal processor 2 holds the complex function in which the amount of compensation for a peak shift is determined from both the range chirp rate $K_r$ bar in the segment in the azimuth direction to which the received data belongs and the azimuth frequency $f_\eta$, as shown in the following equation (2) (please note that, in the document of this description, such express ion "$K_r$ bar" is used because the over-bar character "-" cannot be attached to any letters under the restrictions on electronic filing).

$$C[f_\tau, f_\eta] = \exp\left[j2\pi f_\tau \frac{f_0}{K_r}\right] \quad (2)$$

The term $f_\eta/[K_r\text{ bar}]$ contributes to the compensation for a peak shift in the complex function shown by the equation (2).

When receiving the received data subjected to the discrete Fourier transform from the range DFT unit 23, the function value multiplier 24 acquires information showing the range chirp rate $K_r$ bar in the segment in the azimuth direction to which the pulse signal emitted at an azimuth time η belongs, information showing the azimuth frequency $f_\eta$, and information showing a range frequency $f_\gamma$ from the SAP sensor 1, and substitutes the range chirp rate $K_r$ bar, the azimuth frequency $f_\eta$ and the range frequency $f_\tau$ into the complex function shown by the equation (2), thereby calculating the function value $C[f_\gamma, f_\eta]$ of the complex function.

Although the example in which the function value multiplier 24 of the signal processor 2 acquires the above-mentioned pieces of information from the SAR sensor 1 is shown above, the function value multiplier does not have to acquire the above-mentioned pieces of information from the SAR sensor 1 in a case in which the signal processor 2 manages the above-mentioned pieces of information and controls the SAR sensor 1.

After calculating the function value $C[f_\gamma, f_\eta]$ of the complex function, the function value multiplier 24 multiplies the received data subjected to the discrete Fourier transform outputted from the range DFT unit 23, by the function value $C[f_\gamma, f_\eta]$, thereby compensating for the peak shift of the distance R, the peak shift occurring in the received signal subjected to the range compression, and outputs the received data subjected to the function value multiplication, to the range IDFT unit 25 (in step ST25).

Although the example of compensating for the peak shift of the distance R by multiplying the received data subjected to the discrete Fourier transform by the function value $C[f_\gamma, f_\eta]$ of the complex function shown by the equation (2) is shown above, the peak shift of the distance R can be compensated for by alternatively multiplying the received data subjected to the discrete Fourier transform by the function value of even a function other than that shown by the equation (2), as long as the function has a function of compensating for the peak shift of the distance R (as long as the function has a linear phase change), like the complex function shown by the equation (2).

When receiving the received data subjected to the function value multiplication, the range IDFT unit 25 of the signal processor 2 performs a discrete inverse Fourier transform, in the range direction, on the received data and outputs the received data subjected to the discrete inverse Fourier transform, to the azimuth IDFT unit 26, in order to return the received data to a signal on range time space (in step ST26).

When receiving the received data from the range IDFT unit 25, the azimuth IDFT unit 26 of the signal processor 2 performs a discrete inverse Fourier transform, in the azimuth direction, on the received data and outputs the received data subjected to the discrete inverse Fourier transform, to the segment combiner 27 (in step ST27).

When the range IDFT unit 25 and the azimuth IDFT unit 26 return the received data to a signal on the range time space, the segment combiner 27 of the signal processor 2 combines the received data belonging to an identical segment in the azimuth direction, and outputs the received data subjected to the combining, to the image reconstruction processing unit 14 (in step ST28).

When receiving the received data subjected to the process of compensating for the peak shift from the segment combiner 27, the image reconstruction processing unit 14 of the signal processor 2 reconstructs an SAR image by performing commonly used image reconstruction processing, such as range compression and azimuth compression, on the received data (in step ST29) and stores the SAR image in the SAR image storage 15 (in step ST30), that according to above-mentioned Embodiment 1.

A peak shift of the distance R does not occur in the received data subjected to the range compression and the distance R shown by the received signal subjected to the range compression appears at a position shown by the symbol "o" in FIG. 5B because, in the image reconstruction processing, the range compression is performed on the received data subjected to the process of compensating for a peak shift.

As can be seen from the above description, because the synthetic aperture radar apparatus according to this Embodiment 2 compensates for a peak shift of the distance R occurring in the received signal subjected to the range compression by simply causing the function value multiplier 24 to multiply the received data subjected to a discrete Founder transform by the function value $C[f_\gamma, f_\eta]$ of a complex function in range frequency/azimuth frequency space, Embodiment 2 provides an advantage of being able to reconstruct an SAR image in which no azimuth ambiguity occurs, like above-mentioned Embodiment 1, even when down-chirp pulse signals are continuously emitted for multiple times after up-chirp pulse signals are continuously emitted for multiple times.

Further, the function value multiplier can be easily incorporated into an existing synthetic aperture radar apparatus. Further, the occurrence of azimuth ambiguity can be prevented almost without increasing the arithmetic load.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The synthetic aperture radar apparatus according to the present invention is suitable for use as a synthetic aperture radar apparatus that needs to compensate for a peak shift of a distance occurring in the received signal subjected to range compression due to a movement of an SAR sensor 1, and reconstruct a high-accuracy SAR image.

REFERENCE SIGNS LIST

1: SAR sensor (synthetic aperture radar sensor); 2: signal processor; 11: range DFT unit (Fourier transform unit; peak shift compensation means); 12: function value, multiplier (peak shift compensation means); 13: range IDFT unit (inverse Fourier transform unit, peak shift compensation means); 14: image reconstruction processing unit (image reconstruction processing means); 15: SAR image storage; 21: segmentation unit (peak shift compensation means); 22: azimuth DFT unit (Fourier transform unit, peak shift compensation means); 23: range DFT unit (Fourier transform unit, peak shift compensation means); 24: function value multiplier (peak shift compensation means); 25: range IDFT unit (inverse Fourier transform unit, peak shift compensation means); 26: azimuth IDFT unit (inverse Fourier transform unit, peak shift compensation means); and 27: segment combiner (peak shift compensation means).

The invention claimed is:

1. A synthetic aperture radar apparatus comprising:
   a synthetic aperture radar sensor to emit chirp signals into space, said each chirp signal being a pulse signal that has a frequency changing with time and a range chirp rate indicating a rate of change of said frequency being switched, and to receive reflected waves of said chirp signals which are reflected by a target to thereby output received signals of said reflected waves; and
   a signal processor including an image reconstruction processor that performs range compression on the received signals outputted by said synthetic aperture radar sensor, and reconstructs a synthetic aperture radar image from the received signals subjected to the range compression,
   said signal processor further including a peak shift compensator that compensates for a peak shift of a distance between said synthetic aperture radar sensor and said target, the peak shift occurring in the received signal subjected to the range compression performed by said image reconstruction processor, due to a movement of said synthetic aperture radar sensor during a time period until the reflected waves of the chirp signals are received by said synthetic aperture radar sensor after said chirp signals are emitted from said synthetic aperture radar sensor,
   said peak shift compensator having:
   a DFT unit to perform a discrete Fourier transform on the received signals outputted by said synthetic aperture radar sensor; and
   a function value multiplier to multiply the received signals subjected to the discrete Fourier transform, by function values of a complex function defined by the range chirp rate at an azimuth time and an azimuth angle in a transmission direction of the pulse signal at the azimuth time, thereby to compensate for the peak shift.

2. The synthetic aperture radar apparatus according to claim 1, wherein said synthetic aperture radar sensor emits said chirp signals while changing transmission directions of said chirp signals.

3. The synthetic aperture radar apparatus according to claim 1, wherein said synthetic aperture radar sensor emits, as said each chirp signal, either an up-chirp pulse signal having a frequency increasing with time or a down-chirp pulse signal having a frequency decreasing with time, into space.

4. The synthetic aperture radar apparatus according to claim 1, wherein the complex function is defined by the range chirp rate, the azimuth angle, a range frequency and a moving speed of said synthetic aperture radar sensor.

5. The synthetic aperture radar apparatus according to claim 1, wherein said peak shift compensator further has an IDFT unit to perform a discrete inverse Fourier transform on the received signals being multiplied by said function value multiplier.

* * * * *